T. N. BLADE.
SAW FILING DEVICE.
APPLICATION FILED OCT. 31, 1914.
1,198,411.
Patented Sept. 19, 1916.
5 SHEETS—SHEET 1.
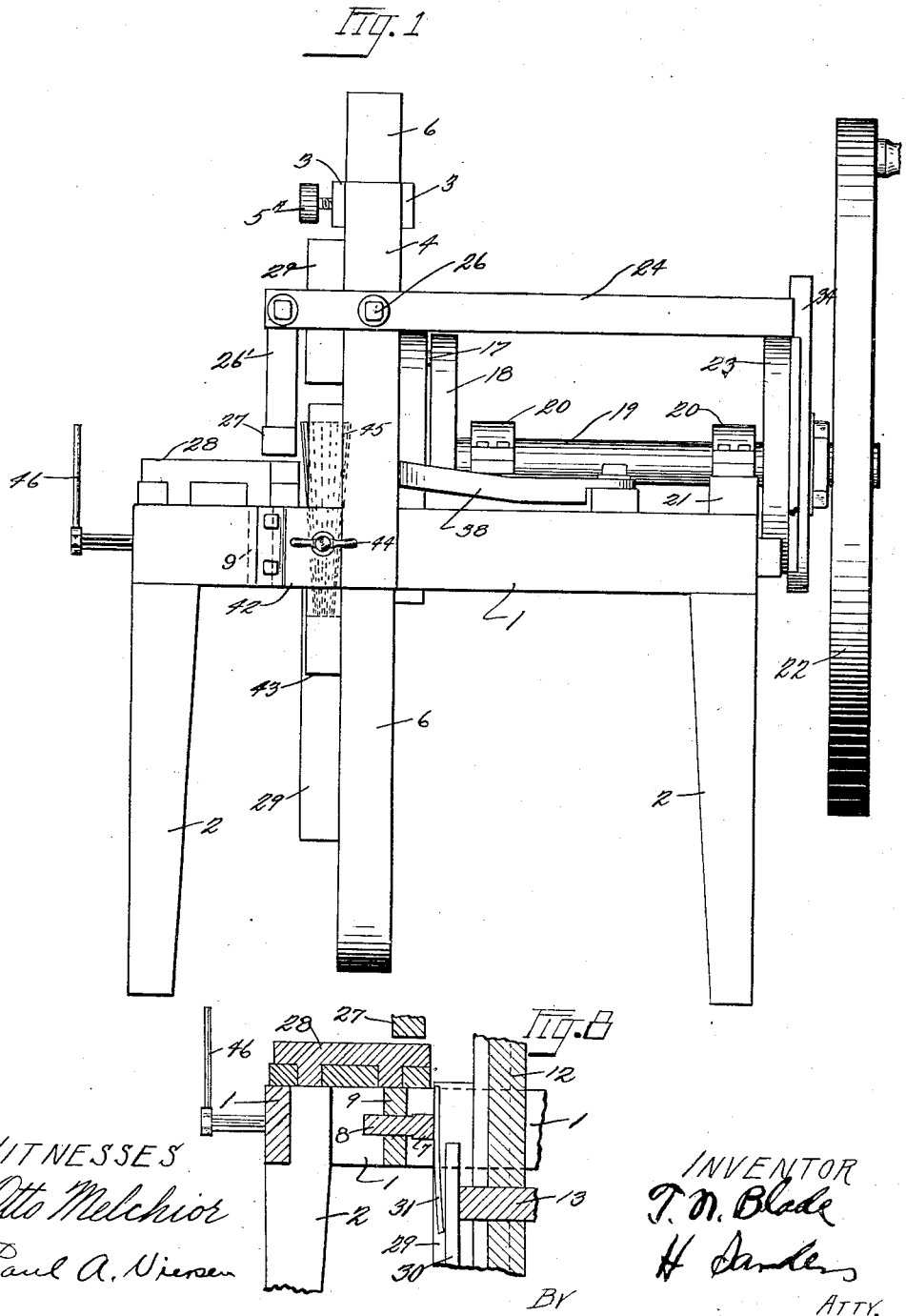

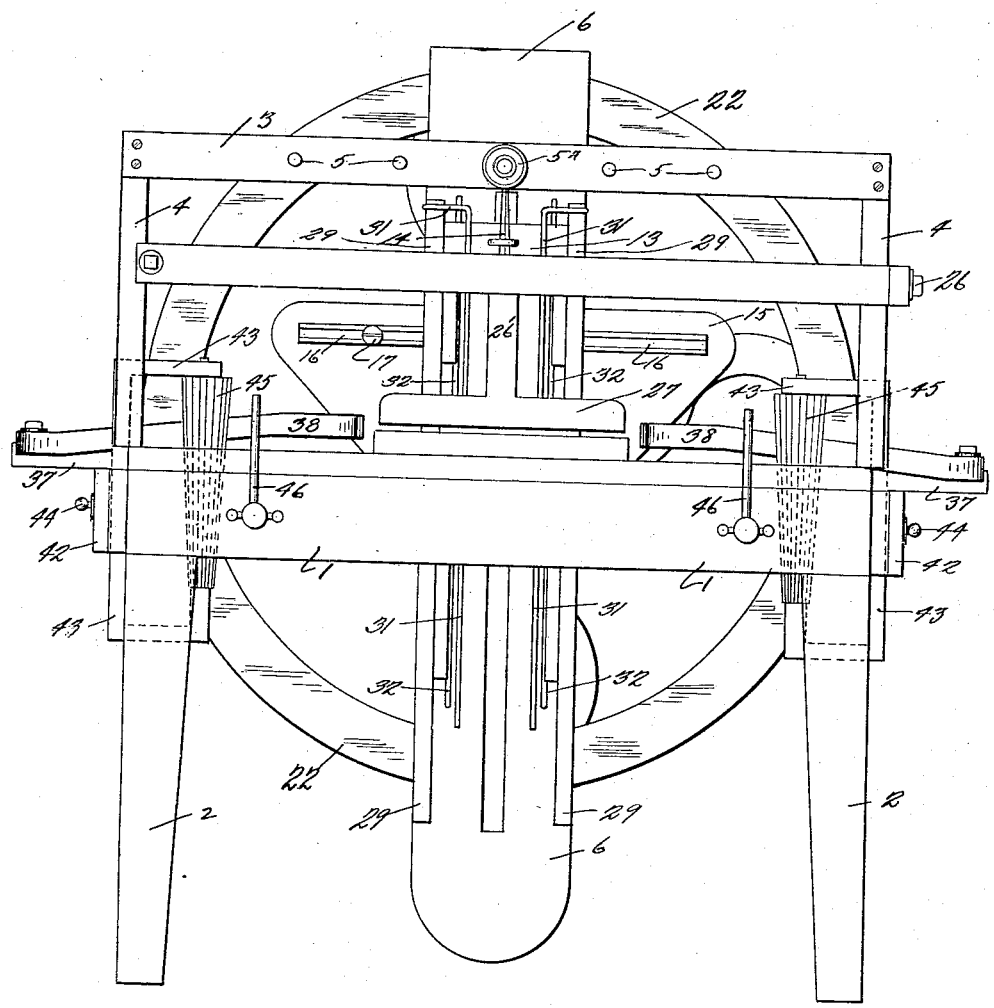

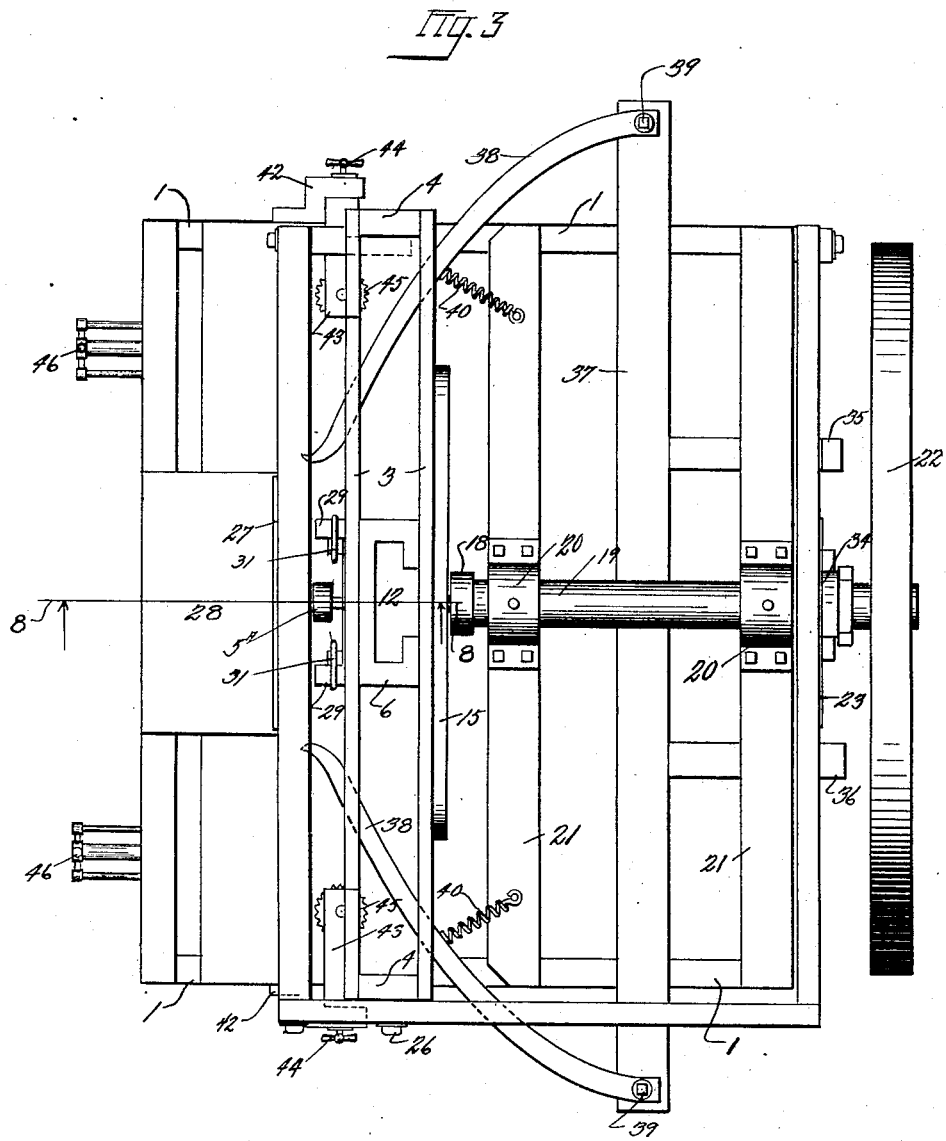

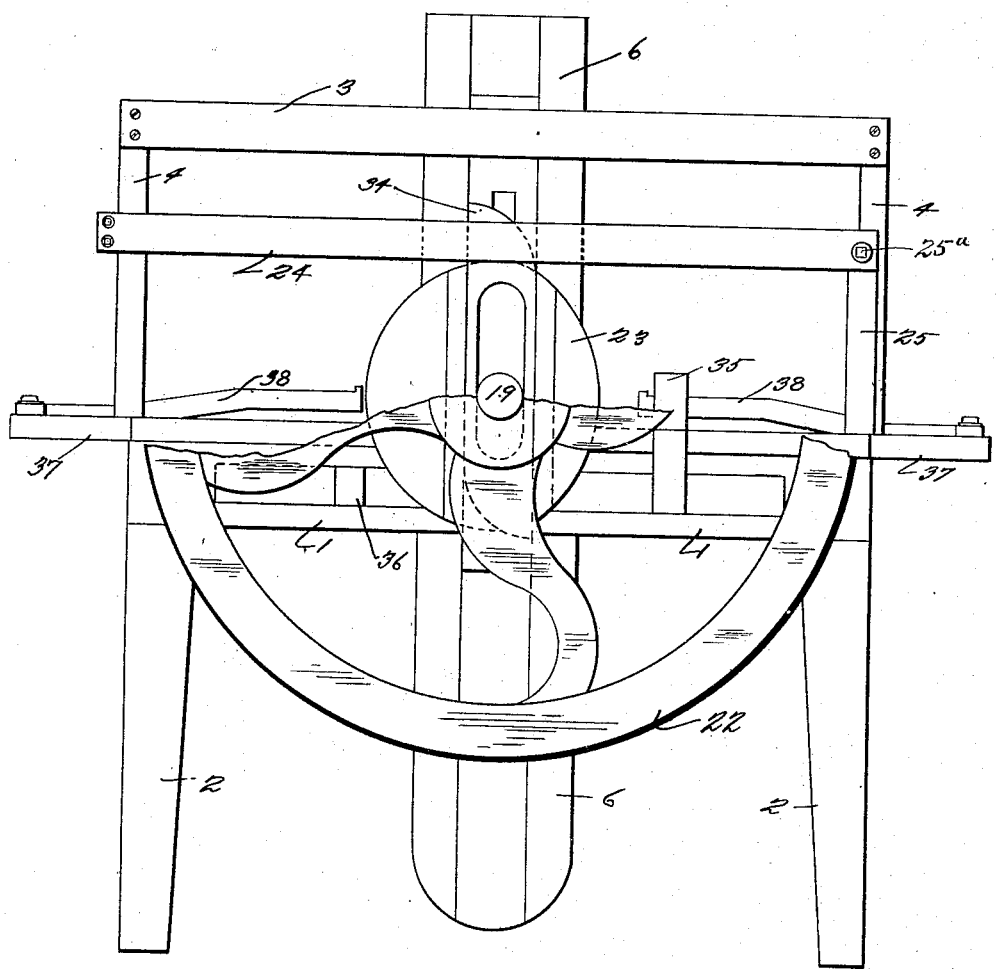

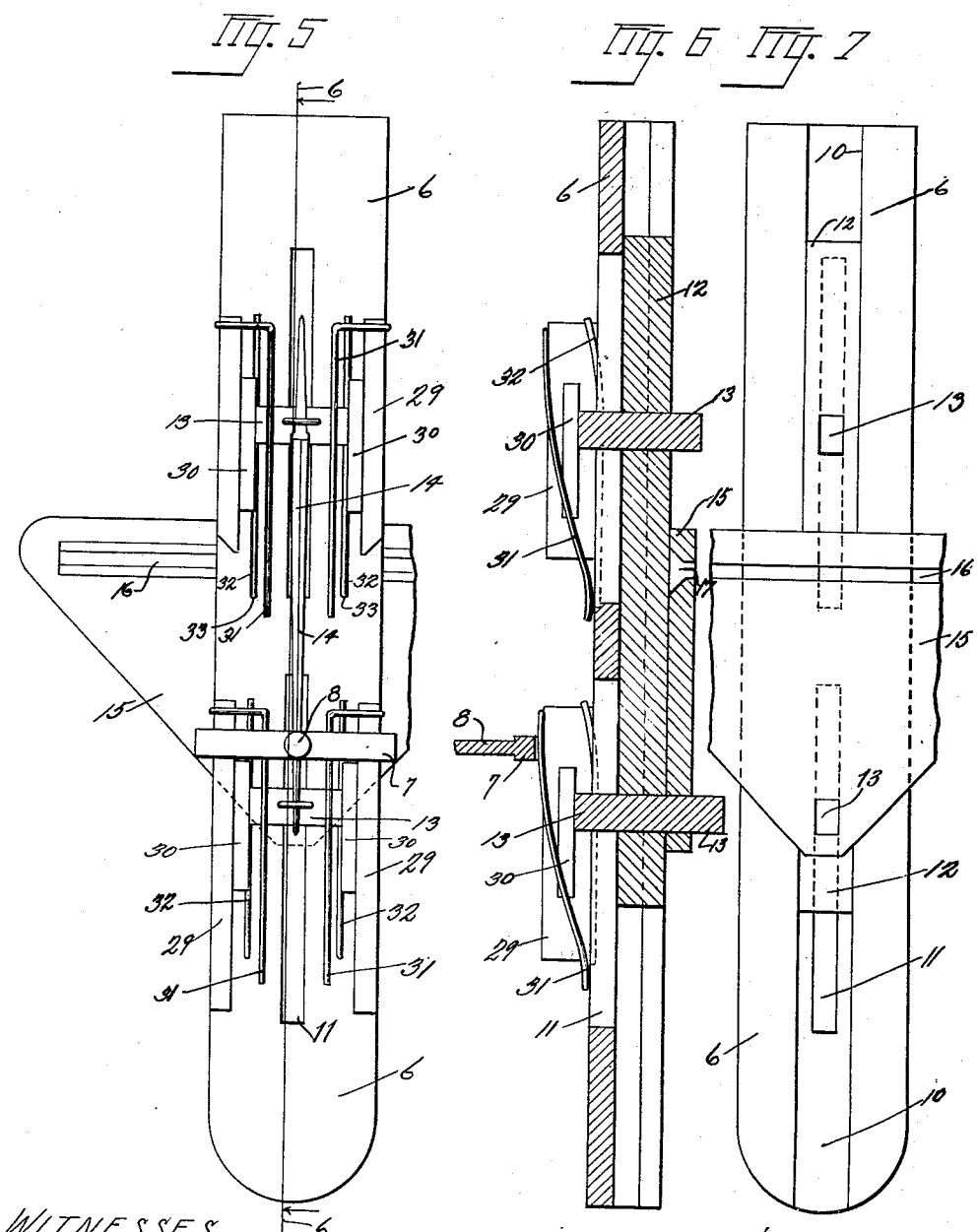

UNITED STATES PATENT OFFICE.

THURE N. BLADE, OF ROCHESTER, NEW YORK.

SAW-FILING DEVICE.

1,198,411.  Specification of Letters Patent.  Patented Sept. 19, 1916.

Application filed October 31, 1914. Serial No. 869,594.

*To all whom it may concern:*

Be it known that I, THURE N. BLADE, a citizen of Sweden, residing at Rochester, in the county of Monroe and State of New York, have invented certain new and useful Improvements in Saw-Filing Devices, of which the following is a specification.

This invention relates to improvements in saw filing devices and it comprises a table provided with a saw support and with a reciprocating file adapted to be set at any angle to the saw desired; means for automatically moving the saw forward a distance equal to the space between the saw teeth are also provided so that the file at each stroke will encounter another tooth.

With the foregoing and other objects in view the invention consists in the combination and arrangement of parts to be hereinafter fully described in the following specification, pointed out in the claims and illustrated in the accompanying drawings which form a part of said specification and in which—

Figure 1 is an end elevation of my improved saw filing device. Fig. 2 is a rear view. Fig. 3 is a plan view. Fig. 4 is a front view with a portion of the hand wheel broken away. Fig. 5 is an enlarged view of the file-carrying and operating mechanism detached from the balance of the device. Fig. 6 is a vertical section taken on line 6—6 of Fig. 5. Fig. 7 is a view of Fig. 5 turned upon its axis through an arc of 180 degrees. Fig. 8 is a section taken on line 8—8 of Fig. 3.

Like reference characters indicate corresponding parts throughout the several views.

The reference numeral 1 designates the table supported upon legs 2. Above the table a guide-frame 3 is supported by standards 4, 4 carried by the table and said frame is formed with a plurality of apertures 5 adapted to receive a set screw 5ª to releasably lock a file-guide-frame 6 in adjusted position. The said file-guide-frame extends through a central opening in the table and is supported in a yoke 7 carried upon a pivot 8 which is disposed in one of the crosspieces 9 of the table top. The file-guide-frame 6 is formed along one face with a longitudinally extending centrally disposed channel 10 which merges into a slot 11 of narrower formation than said channel and in said channeled portion a plunger 12 is slidably disposed and it is provided with a pair of cross-heads 13, 13 which are movable in a plane parallel to said plunger and which carry the file 14. To the plunger 12 a block 15 is secured and the same is formed with a slot 16 in which a pin 17 works that is carried by a pitman 18 terminally carried by the shaft 19, journaled in bearings 20, 20 carried by beams 21 carried by the table top, that carries the hand wheel 22.

Upon the shaft 19 a cam block 23 is carried which, as the shaft 19 rotates, intermittently engages and raises a U-shaped frame 24 supported at one end by a standard 25 at 25ª secured to the table and pivotally supported at 26 by one of the standards 4. To the side of the U-shaped frame 24 remote from the standard 25 a block 26′ is secured which carries a crosshead 27 designed for intermittent engagement with a block 28, carried by the table 1, whereon the saw (not shown) rests. As the cam block comes in contact with the U-shaped frame it tilts it upon its pivot and forces the cross-head down upon the saw locking it against movement.

Referring again to the file-guide-frame, the same is formed along one face with marginal cleats 29 to which oppositely disposed guides 30 are secured which are spaced away from the face of the file-guide-frame so that the crosshead 13 may pass over either lateral face of said guides 30. To each lateral or narrow face of the file-guide-frame an angular spring 31 is secured and said springs extend toward each other over the cleats 29 to points beyond the planes of the relatively adjacent faces of the guides 30 and then said springs extend longitudinally of the file-guide-frame and are bent inwardly or toward that frame and engage the same frictionally at points below the terminations of said cleats.

Springs 32 are secured at 33 to the face of the file-guide-frame and extend between that frame and the guides 30 and are curved outwardly or away from the file-guide-frame toward their free extremities; these springs bear against one side of the crosshead 13 to force it away from the file-guide-frame while the springs 31 bear against the opposite side of said crosshead to force it toward the file-guide-frame. As the hand wheel 22 is rotated and the crossheads 13 descend with the file the springs 32 force said crossheads outward and cause them to ride over the outer faces of the guides 30 thus bringing the file in contact with one tooth of the saw and filing the same. When the crossheads 13 reach the limit of their stroke in this direction they pass beyond the guides 30 and are then forced under the same by the springs 31 and upon the return movement the file is drawn back out of engagement with the saw tooth.

While the operation just described is in progress another cam block 34 carried upon the shaft 19, as said shaft rotates, engages a finger 35 and then a finger 36, both of which are projections of an oscillating bar 37 extending across the top of the table 1 and movable thereupon. To each end of the bar 37 a prong 38 is pivoted as at 39 and each prong 38 is connected by a spring 40 to a crosspiece 21 secured to the table 1. As the cam block 34 engages the finger 35 it moves the bar 37 and prong 38 in a direction that will cause said prong to advance the saw over the block 28 a distance equal to the distance between any two consecutive saw teeth; as the cam block moves into contact with the finger 36 the prongs 38 are moved to initial position, the crosshead 27 coming down upon the saw at the same time to prevent accidental displacement of the same by accidental contact with either of the prongs. It will be noted that the downward movement of the file occurs while the prongs are being moved to initial position and while the saw is retained firmly against the block 28 and the upward idle movement of the file occurs while the prongs are advancing the saw for the next stroke of the file.

To the table 1 brackets 42 are disposed in which frames 43 are vertically slidably carried and are releasably locked in adjusted position by means of set screws 44. Each frame 43 carries a rotary corrugated saw guide 45 of greater diameter at one end than at the other so that the saw may be set close to or far from the file as desired in order to give the tooth a deep or narrow cutting edge as desired. Adjustable guards 46 carried by the table prevent the saw being accidentally forced from the block 28.

What is claimed is:—

1. A saw filing device comprising a table, a file-guide-frame adjustably carried by said table, a file movably mounted in said file-guide-frame, marginal cleats carried by said file-guide-frame, guides carried by said cleats and spaced away from said file-guide-frame, one set of springs terminally embedded in said file-guide-frame to frictionally engage the file mount as it passes over one side of said guides and another set of springs terminally embedded in said file-guide-frame to frictionally engage the file mount as it passes over the opposite side of said guides.

2. A saw filing device comprising a table, an adjustable file-guide-frame carried by said table and formed along one face with a channel and along the opposite face with a longitudinal slot registering throughout its length with said channel, marginal cleats carried upon one side of said file-guide-frame, guides carried by said cleats and spaced away from said file-guide-frame, a plunger disposed upon the opposite side of said file-guide-frame in the channeled portion thereof, file-carrying means carried by said plunger and projected through the slot in said file-guide-frame, and means carried by said file-guide-frame and operatively associated with said file-carrying means for disposing the same above said guides as they move in one direction and beneath said guides as they move in the opposite direction.

In testimony that I claim the foregoing as my own I have hereto affixed my signature in the presence of two subscribing witnesses.

THURE N. BLADE.

Witnesses:
 CARL W. OBERG,
 HENRY A. BENTSON.

Copies of this patent may be obtained for five cents each, by addressing the "Commissioner of Patents, Washington, D. C."